July 21, 1925.
W. E. CO HAGAN
PISTON RING
Filed Oct. 24, 1924
1,546,368
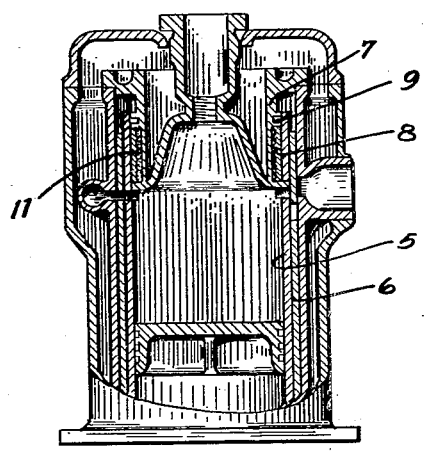
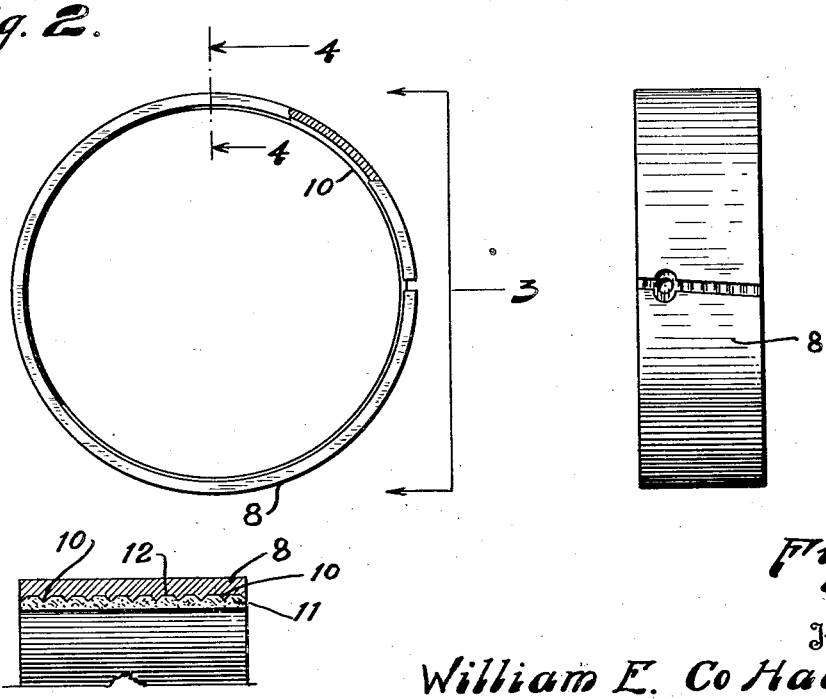
Inventor
William E. Co Hagan
By A. J. O'Brien
Attorney Patented July 21, 1925.

1,546,368

UNITED STATES PATENT OFFICE.

WILLIAM E. CoHAGAN, OF DENVER, COLORADO.

PISTON RING.

Application filed October 24, 1924. Serial No. 745,612.

*To all whom it may concern:*

Be it known that I, WILLIAM E. CoHAGAN, a citizen of the United States, residing at the city and county of Denver and State of Colorado, have invented certain new and useful Improvements in Piston Rings; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in the construction of piston rings of the type disclosed and claimed in United States Letters Patent No. 1,385,508, granted July 26, 1921, and No. 1,512,746, granted October 21, 1924.

The idea common to the construction shown in both of the patents referred to is a piston packing composed of an outer expansion metallic ring and an inner sealing member, the inner surface of the ring being constructed to penetrate the sealing member readily in order to form a seal.

The constructions shown and described in the above-identified patents have been manufactured in large numbers and have given satisfactory service. I have found, however, that more advantageous results are obtained if the construction of the ring is changed so that the bottoms of the grooves are flat instead of coming to a sharp point as in the construction shown in the patent granted to me on October 21, 1924.

It is evident that if a wide, thin ring is made, the W-shaped inner surface will require several grooves and V-shaped surfaces, which, if they are to be spaced the optimum distance apart, will be too deep and cut away too much of the material of the ring. If the V-shaped surfaces are placed so close together that they do not weaken the ring to any appreciable extent, they will not penetrate the sealing material to a sufficient depth to form the best possible seal. Another reason why better sealing action is obtained when the V-shaped surfaces have their bases spaced apart and connected by flat cylindrical surfaces, is that the sharp surfaces will penetrate the sealing material and still permit the latter to come into contact with the bottom of the grooves, whereas, if the V-shaped surfaces come together at an angle, the sealing material will not project into the space between the surfaces sufficiently to contact with the bottom of the grooves, for the reason that the sealing material, which may be cork, asbestos, felt, or other similar suitable material, is elastic and forms somewhat curved surfaces between the grooves formed therein by the sharp surfaces of the ring. Another advantage of having the V-shaped surfaces spaced at their bases by a flat cylindrical surface, is that the angles between the sides of these surfaces may be made less so that they will more readily penetrate the sealing material.

When wide, thin rings, such as are sometimes used in what is known as sleeve-valve engines and known as "junk" rings, are used, the advantage of spacing the V-shaped surfaces at their bases is very marked, as fewer surfaces are required and the penetrating ridges may be made sharper.

My present improvement can be most clearly described and will be most readily understood when reference is had to the accompanying drawing, in which the invention is illustrated, and in which:

Fig. 1 shows a sectional view of a sleeve-valve engine showing the location of the junk ring;

Fig. 2 is a top plan view of my improved ring, a portion thereof being broken away;

Fig. 3 is a side elevation looking in the direction of arrows 3; and

Fig. 4 is a section taken on line 4—4, Fig. 2.

In Fig. 1 I have shown my improved ring in place in a sleeve-valve engine. The sleeves 5 and 6 are reciprocated by suitable means, not shown. The cylinder-head 7 has a cylindrical portion that projects into sleeve 5. A gas-tight joint is formed between the cylindrical portion of the cylinder head 7 and the inner surface of sleeve 5 by means of the junk ring 8 and an ordinary piston ring 9, both of which may preferably be made in accordance with my present invention.

The construction of my improved ring may be most readily understood from Figs. 2, 3 and 4. It will be noticed from Figs. 2 and 3 that the ring illustrated is wider than the ordinary piston ring. From the section shown in Fig. 4 the construction of my ring can be clearly seen. It will be noted that the inner surface of the ring is provided with a plurality of spaced, parallel ridges 10 of V-shaped cross-sections, which penetrate the outer surface of the sealing material 11. The sides of the V-shaped surfaces terminate and merge into the flat cylindrical connecting surfaces 12, against which the outer surface of the ring 11 presses. This construction permits the inner surface of the ring to come into actual and intimate contact with the outer surface of the sealing member at all points and permits the angle between the sides of each V-shaped ridge to be as small as may be desired so that they will penetrate the surface of the sealing member very readily.

Although I have illustrated my invention in connection with a wide ring, it is evident that it is as well suited for rings of ordinary width.

Having now described my invention, what I claim as new is:

1. A piston ring having its inner surface formed by a plurality of parallel annular cylindrical surfaces spaced by V-shaped inward projections.

2. A piston ring having its inner surface provided with a plurality of inwardly projecting, parallel, annular ridges of V-shaped cross-sections spaced by cylindrical surfaces.

3. In combination, a cylindrical member having a piston ring groove, a metal ring in said groove, a sealing ring between the inner surface of the ring and the bottom of the groove, the inner surface of the ring having a plurality of spaced, inwardly projecting parallel ridges adapted to penetrate the surface of the sealing ring, said ridges being separated at their bases by narrow cylindrical surfaces.

In testimony whereof I affix my signature.

WILLIAM E. COHAGAN.